(12) United States Patent
Schwemmer (10) Patent No.: US 10,102,169 B2
(45) Date of Patent: Oct. 16, 2018

(54) SYSTEM AND METHOD FOR PORT MIGRATION IN A PCIE SWITCH

(71) Applicant: Microsemi Storage Solutions (U.S.), Inc., Aliso Viejo, CA (US)

(72) Inventor: Kurt Schwemmer, Colorado Springs, CO (US)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 143 days.

(21) Appl. No.: 15/232,215

(22) Filed: Aug. 9, 2016

(65) Prior Publication Data

US 2017/0046295 A1    Feb. 16, 2017

Related U.S. Application Data

(60) Provisional application No. 62/202,975, filed on Aug. 10, 2015.

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
CPC .................................................. G06F 11/1417
See application file for complete search history.

(56) References Cited

U.S. PATENT DOCUMENTS

| 8,359,415 | B2 | 1/2013 | Brown et al. | |
| 8,423,698 | B2 | 4/2013 | Matthews et al. | |
| 8,583,848 | B2 * | 11/2013 | Miyoshi | G06F 13/102 710/302 |
| 9,025,495 | B1 | 5/2015 | Brown et al. | |
| 9,146,890 | B1 | 9/2015 | Brown et al. | |
| 2006/0242353 | A1 * | 10/2006 | Torudbakken | G06F 13/4022 710/316 |
| 2012/0096192 | A1 * | 4/2012 | Tanaka | G06F 13/385 710/20 |

* cited by examiner

*Primary Examiner* — Henry Tsai
*Assistant Examiner* — Juanito Borromeo
(74) *Attorney, Agent, or Firm* — Leber IP Law; Dennis R. Haszko (57) ABSTRACT

The present disclosure provides a method and system for dynamically migrating a port in a PCIe switch. The PCIe switch comprises emulated P2P bridges stored in a memory and a processor to load the emulated P2P bridge address range values from the memory to a routing table. The processor can configure the routing table so that the P2P bridges can be remapped to various physical ports of the switch. Therefore, a device connected to a physical port may be migrated from one host to another, via the operations of the processor.

12 Claims, 8 Drawing Sheets

SYSTEM AND METHOD FOR PORT MIGRATION IN A PCIE SWITCH

CROSS REFERENCE TO RELATED APPLICATIONS

This application claims the benefit of priority of U.S. Provisional Patent Application No. 62/202,975 filed Aug. 10, 2015, which are hereby incorporated by reference.

FIELD

The present disclosure relates to PCIe (Peripheral Component Interconnect Express) switches.

BACKGROUND

A PCIe switch is a device that connects one or more upstream PCIe devices (e.g. hosts or PCIe root complexes) to multiple downstream PCIe devices (e.g. hard drives, SSDs, other peripherals, or PCIe endpoints). A conventional PCIe switch comprises a switch matrix that routes PCIe traffic between the PCIe devices. The conventional PCIe switch logically routes PCIe traffic via P2P (PCI to PCI) bridges associated with each port of the switch. In a multiple-host configuration, the switch matrix is programmed to logically partition the P2P bridges and each host connects to a separate partition of the PCIe switch. The external devices connect to the logical P2P bridges via physical ports.

For various purposes, a user may wish to move a downstream device between a partition of a first host and a partition of a second host. Due to the logical separation of the partitions in a conventional PCIe standard-compliant switch, the downstream device needs to be physically disconnected from a port belonging to the partition of the first host, and then physically connected to a different port belonging to the partition of the second host. This is known as a hot-plug event and necessitates manual and physical intervention by a user.

It is also known to use PCIe standard non-compliant methods to provide switch functions such as non-transparent bridging (NTB). NTB allows multiple hosts to concurrently access common downstream devices, typically at the cost of reduced functionality in some standard PCIe features. While not specifically aimed at the application of moving a downstream device from one partition to another, PCIe standard non-compliant switches may allow a downstream device to move from one partition to another, at the cost of reduced switch functionality for PCIe standard features.

It is desirable to obviate or mitigate some of the disadvantages associated with conventional PCIe switches, both standard-compliant and non-compliant, when moving downstream devices from one host or partition to another.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for dynamically migrating a port in a PCIe switch. The PCIe switch in accordance with the present embodiments comprises a virtualization layer or emulation layer for dynamically providing P2P bridge functions to physical ports. The PCIe switch may implement, via the emulation layer, emulated P2P bridges stored in a memory and a processor to load the emulated P2P bridges from the memory to a routing table. The processor can configure the routing table so that the P2P bridges can be remapped to various physical ports of the switch. Therefore, a device connected to a physical port may be migrated from one host to another, via the operations of the processor, without physical disconnection of the device from the port.

The migration of a port (and its physically connected device) from one host and partition to another host and partition may be executed automatically by the processor, without the manual intervention of a user. The processor may execute the automatic migration in response to a request from the host or the device, or some application software running on either of the host and the device. The automatic migration request may be related to dynamic resource allocation processes or host failover redundancy processes, for example.

In an embodiment, the present disclosure provides a PCIe switch comprising: a plurality of ports, comprising at least one upstream port and at least one downstream port; a switch fabric electrically connected to the plurality of ports; a routing table in communication with the switch fabric; a memory; and a processor in communication with the switch fabric, the routing table and the memory for: creating a first configuration space of a first emulated P2P (PCI to PCI) bridge in the memory, the first emulated P2P bridge being associated with a first logical switch partition; receiving a request to migrate a selected downstream port to the first logical switch partition, the selected downstream port having a port ID and being associated with a second logical switch partition retrieving a first address range from the first configuration space in the memory; and configuring the routing table to associate the port ID of the selected downstream port with the first address range.

In an embodiment, the present disclosure provides a method for migrating a downstream port in a PCIe switch, the method comprising: creating a first configuration space of a first emulated P2P (PCI to PCI) bridge in a memory, the first emulated P2P bridge being associated with a first logical switch partition; receiving, at a processor, a request to migrate the downstream port to the first logical switch partition, the downstream port having a port ID and being associated with a second logical switch partition; retrieving a first address range from the first configuration space in the memory; and configuring a routing table to associate the port ID of the downstream port with the first address range.

In an embodiment, the present disclosure provides a PCIe switch comprising: a first upstream port associated with a first partition; a second upstream port associated with a second partition; a number of downstream ports; a switch fabric electrically connected to the first upstream port, the second upstream port, and the downstream ports; a routing table in communication with the switch fabric; a memory programmed to store a first number of configurations of emulated P2P (PCI to PCI) bridges associated with the first partition and to store a second number of configurations of emulated P2P bridges associated with the second partition, the sum of the first and second numbers of configurations being greater than the number of downstream ports; and a processor electrically connected to the switch fabric and in communication with the routing table and the memory for: reading configurations of emulated P2P bridges from the memory; and programming the routing table according to the configurations of emulated P2P bridges stored in memory.

In the following description, the terms virtualization, emulation and emulated are interchangeable and refer to the concept of implementing logical or functional features of a hardware circuit using firmware running on a processor coupled to a memory.

The term migrating means moving or remapping the logical to physical connection between a P2P bridge and a port. Migrating involves unbinding a port from a P2P bridge and binding the port to another P2P bridge. Unbinding means logically dissociating the port and the P2P bridge; thus, unbound means that the P2P bridge is not mapped to any physical port. Binding means logically associating the port and the P2P bridge.

Figure 1:
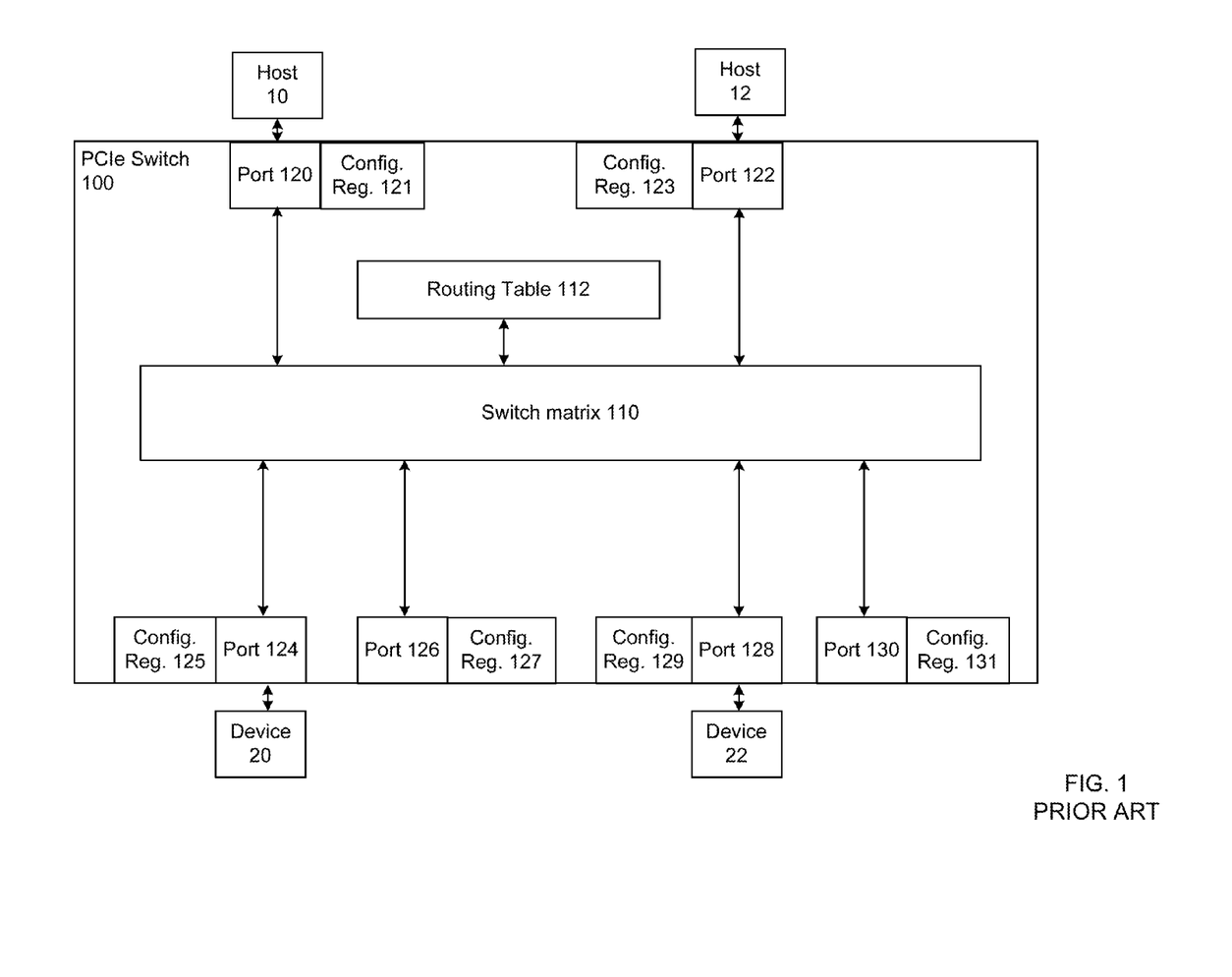
FIG. 1 is a block diagram of a typical PCIe switch known in the art.

FIG. 1 shows a block diagram of a typical PCIe switch 100 known in the art. PCIe switch 100 comprises a switch matrix 110 and typically also comprises at least one routing table 112. Physical ports 120, 122, 124, 126, 128, and 130 are electrically connected to the switch matrix 110 for coupling PCIe devices to the PCIe switch 100.

In an example of a conventional multi-host switch configuration, a first host 10 is connected to port 120 and a second host 12 is connected to port 122. Devices 20 and 22, are connected to ports 124 and 128, respectively.

While all of the ports 120-130 may be electrically connected via the switch matrix 110, the ports (and consequently the hosts and devices connected to the ports) are logically separated. The PCIe switch 100 typically routes data based on address range or device ID. Specifically, the PCIe switch 100 routes data based on entries of address ranges associated with port IDs. These entries are stored in the configuration space of the PCIe switch 100.

Typically, the configuration space comprises one hardware configuration register set for each port, such as hardware configuration register sets 121, 123, 125, 127, 129, and 131. The routing information in the hardware configuration registers 121, 123, 125, 127, 129, and 131 may also be stored in the at least one routing table 112. One purpose for storing routing information in multiple hardware instantiations (i.e. in the hardware configuration registers and in one or more routing tables) is to increase the performance of the PCIe switch.

In a conventional PCIe switch, the hardware configuration register sets have hard-coded associations to the physical ports. The logical functions of the hardware configuration registers are known in the art as a P2P bridge, which is described in further detail below.

When the host 10 connects to the PCIe switch 100, it performs an enumeration process at system initialization. The enumeration process identifies the hardware registers of the various P2P bridges. Since each P2P bridge is associated with a port, the host 10 can determine, via the P2P bridges, all of the ports within its partition of the PCIe switch 100 and whether devices are connected to those ports in order to determine the required address space. Thus, the host 10 allocates endpoint memory address ranges for each port.

The host 10 typically directly programs the routing function of the P2P bridges by loading the address ranges for a desired port into the hardware registers of the P2P bridge of that port. The PCIe switch 100 may then populate entries of the routing table using the address values in the hardware registers of the P2P bridges and the port ID of the associated physical port. Typically, the PCIe switch 100 includes implementation specific logic to populate the entries of the routing table.

However, switch partitioning does not allow both hosts 10 and 12 to enumerate the same ports 124-130. Therefore, in a multiple host configuration, the ports 124-130 are logically separated into two partitions, with each port enumerated by only one host.

Figure 2:
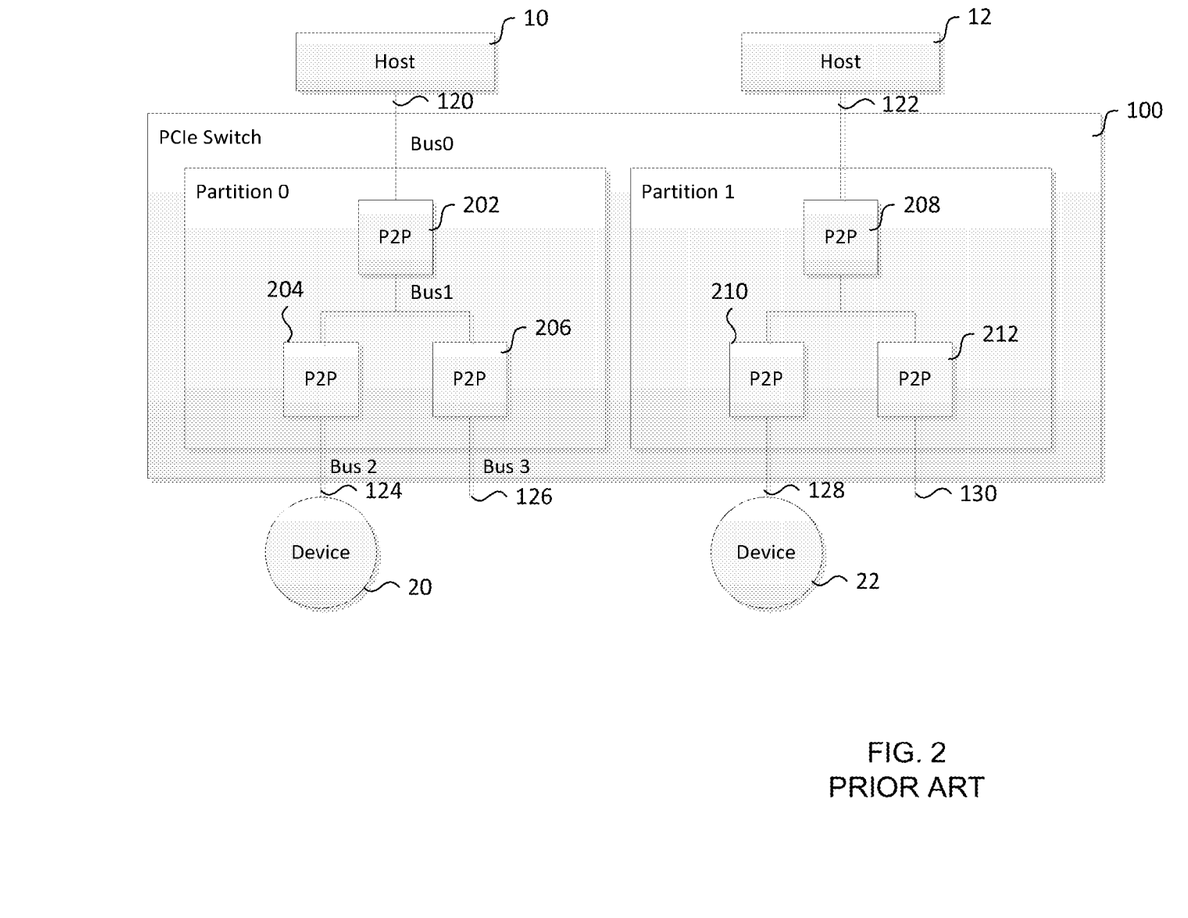
FIG. 2 is a diagram of logically configured P2P bridges in a typical PCIe switch known in the art.

FIG. 2 shows a diagram of logically configured and partitioned P2P bridges in the PCIe switch 100 of FIG. 1. The configuration registers 121, 123, 125, 127, 129, and 131 of FIG. 1 are configured to logically separate the switch into two partitions, each logically associated with a separate host 10 and 12. The hosts can program address ranges into the P2P bridges of each respective partition in order to route PCIe traffic between each host and its downstream devices.

In a conventional configuration or enumeration procedure, the host 10 connects to the PCIe switch 100, sends configuration packets to discover the topology of the partition (the P2P bridges 202, 204 and 206 and device 20), and reserves memory and ID resources for the P2P bridges 202, 204, 206 and the device 20.

Referring back to FIG. 1, the host 10 next programs the routing function of the P2P bridges. The host 20 programs the hardware configuration registers 121, 125, and 127 of the P2P bridges 202-206 with addresses ranges.

The host 10 reads an address range from the memory of the device 20 and configures the hardware register 125 with the address range of the device 20. The routing table 112 also includes an entry mapping the address range of the device 20 to the ID of the port 124. When the host 10 makes a memory access to the address range of the device 20, the switch 100 will route the memory access to the device 20 via the port 124.

Since the port 126 is not connected to any device, the host 10 cannot probe a device for its required memory size for programming the configuration register 127 associated with port 126. Thus, the host 10 writes a default placeholder address range and ID to the configuration register 127 and the routing table 112.

As shown in FIG. 2, each P2P bridge 202-206 of the conventional PCIe switch 100 is associated with a physical port 120, 124, and 126; therefore, the address ranges become mapped to the port IDs of the ports 120, 124, and 126 in the routing table 112. The host 12 similarly performs enumeration to configure P2P bridges 208-212. The address ranges programmed to the hardware registers of the P2P bridges 208-212 are mapped to the port IDs of the ports 122, 128, and 130 in the routing table 112. According to the PCIe specification, the hosts have configured one downstream P2P bridge for each port.

The downstream devices 20 and 22 connect to the P2P bridges via physical ports 124 and 128. In a given partition (e.g., Partition 0) the P2P bridges are assigned to specific ports. Therefore, downstream devices attached to the downstream ports of the partition can only communicate with the host of that partition.

When the downstream device 20 needs to be disconnected from the first host 10 in order to be connected to the second host 12, the downstream device 20 must be physically disconnected from the port 124 (belonging to the partition of the first host 10) and physically connected to the port 130 (belonging to the partition of the second host). This is known as a hot-plug operation.

In the conventional switch hot-plug operation, the system is in steady state operation when the user sends a signal to initiate the hot-plug. The switch port 124 attached to the device 20 receives the hot-plug signal and sends an interrupt signal to the host 10.

The host 10 receives the interrupt signal and stops any pending traffic to the device 20 to be removed. Next, the host 10 unloads the driver of the device and writes to the configuration register set 125 to indicate to the user that the device 20 may be physically unplugged; typically, the configuration register 125 is hard-coded to turn on a light-emitting diode in order to indicate readiness.

Once the user disconnects the device 20 from port 124, the port 124 sends an interrupt signal to the host 10 to indicate that the device 20 has been removed.

When the user connects the device 20 to the port 130, the P2P bridge 212 sends an interrupt signal to the host 12. Since address space and IDs were previously reserved for the unused port 130 during enumeration, the host 12 does not need to allocate additional bus and address resources for the device 20. Therefore, the addresses of the other connected devices (such as device 22) do not need to change. Finally, the host 12 loads the device driver and resumes normal operation.

If, however, the host 12 determines that it needs to allocate additional bus and address resources for the device 20, the host 12 may re-enumerate the P2P bridge 212 to allocate more space.

A conventional PCIe switch typically moves a device from one host to another by performing the physical hot-plug operation described above.

A conventional PCIe switch may also move a device from one host to another by implementing non-standard methods such as NTB. However, it is undesirable to move a device in this way. Because the conventional switch comprises a 1:1 mapping of P2P bridges and physical ports, these non-standard methods for moving a device involve reconfiguring downstream P2P bridges in a system-unfriendly way. These proprietary methods are system-unfriendly because the methods are not supported by commonly-used basic input/output systems (BIOS) or operating systems (OS). Additionally, in a conventional NTB method, functions such as multicast and peer-to-peer messages may not be supported.

In the conventional PCIe switch 100, moving the device 20 from Partition 0 to Partition 1, without performing a physical hot-plug, involves moving the P2P bridge 204 from Partition 0 to Partition 1. Moving the P2P bridge 204 requires reconfiguring the logical partitions. Moving a P2P bridge is system-unfriendly because it is a proprietary process that is not commonly supported.

Figure 3:
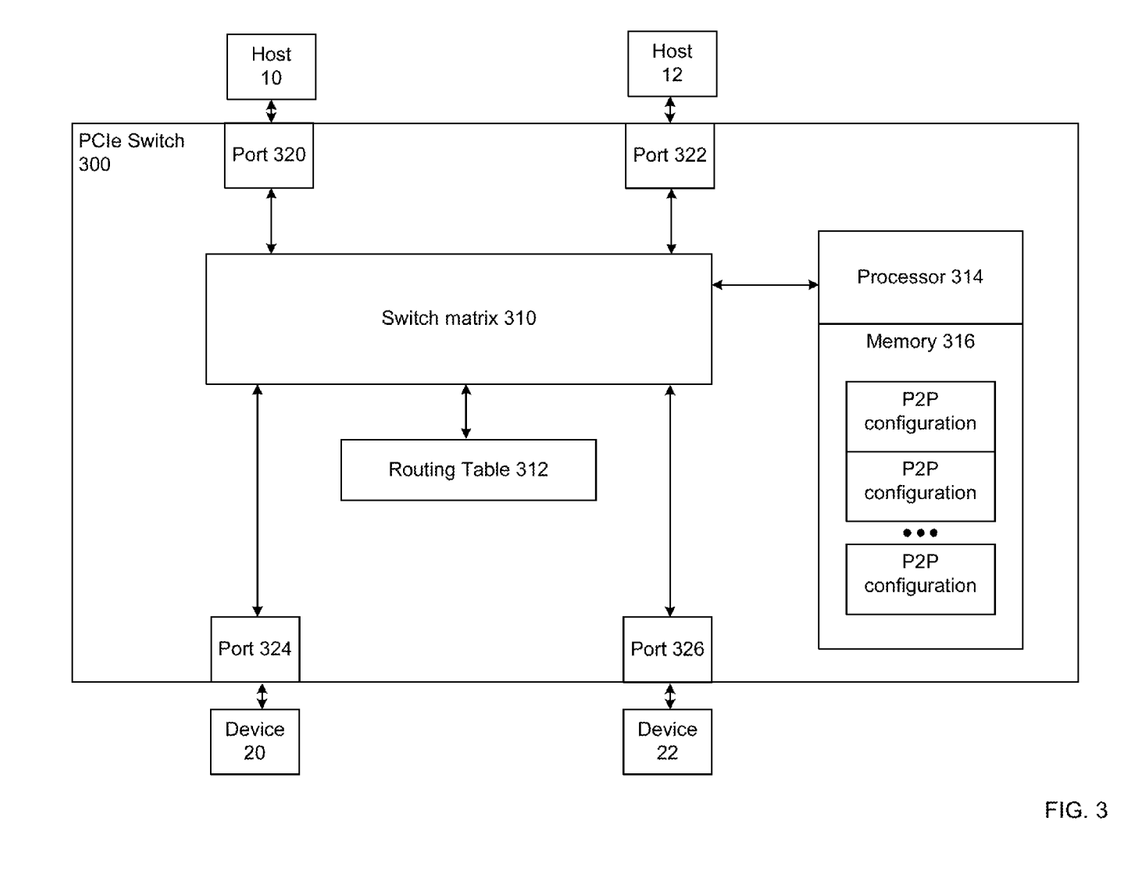
FIG. 3 is a block diagram of a PCIe switch according to an embodiment of the present disclosure.

FIG. 3 shows a block diagram of a PCIe switch 300 used in the context of an embodiment of the present disclosure. The switch 300 provides for system-friendly, PCIe specification compliant, software implemented, port migration from one host to another. Therefore, a device connected to the port can logically migrate from one host to another without a physical hot-plug operation and without moving any P2P bridges across logical partitions.

In an embodiment, the PCIe switch 300 comprises a switch matrix 310, a routing table 312, a processor 314, and a memory 316. Physical ports 320, 322, 324, and 326 are electrically connected to the switch matrix 310 for coupling PCIe devices to the switch 300.

In this embodiment, a first host 10 is connected to port 320 and a second host 12 is connected to port 322. Devices 20 and 22 are connected to ports 324 and 326, respectively. All of the ports 320-326 are electrically connected via the switch matrix 310, and the ports are logically separated into partitions for each host.

However, in FIG. 3, the PCIe switch 300 does not comprise hardware configuration registers associated with the P2P bridges. Rather, the P2P bridges are emulated in a firmware or software running on the processor 314 and the PCIe functions (such as error handling, routing, etc.) of the emulated P2P bridges are implemented by the processor 314. The data stored in the hardware registers of a conventional P2P bridge is stored in the memory 316 in communication with the processor 314. Therefore, the number of emulated P2P bridges supported by the switch 300 is not limited by the physical implementation of P2P bridge hardware registers. Consequently, the switch 300 is not limited to a 1:1 mapping of P2P bridges and physical ports.

The processor 314 configures the routing table 312 using various P2P bridge configuration values stored in the memory 316. During the enumeration process the host 10 programs the P2P bridge associated with the port 324 by transmitting a configuration message, including an address range for port ID of port 324, to the PCIe switch 300. The routing table 312 may be configured to cause the switch matrix 310 to route the configuration message to the processor 314 by default. The processor 314 configures an emulated P2P bridge in the memory 316 based on the address range information in the configuration message from the host 10. The processor 314 also loads the emulated P2P bridge configuration into the routing table 312. Therefore, the host 10 is able to route PCIe traffic to the device 20.

In an implementation, the memory 316 may also include additional emulated P2P bridges that are not currently associated with any physical port. These additional emulated P2P bridges are thus unbound. However, the processor 314 presents these unbound P2P bridges to the host as P2P bridges that are associated with open physical ports (i.e., physical ports with no device plugged in). When the host sees the additional emulated P2P bridges as being associated with open physical ports, the host will reserve resources for these additional emulated P2P bridges. According to this implementation, the switch 300 may have more downstream P2P bridges than physical ports.

Accordingly, the PCIe switch 300 can logically migrate the device 22 from host 12 to host 10 without physically hot-plugging the device 22 and without moving P2P bridges in a system-unfriendly way because each partition of the switch has spare or extra emulated P2P bridges that are not mapped to physical ports. The processor 314 dynamically remaps the physical port 326 from a P2P bridge associated with host 12, to a spare P2P bridge associated with host 10. An example of this dynamic remapping operation is shown in FIGS. 4 and 5.

Figure 4:
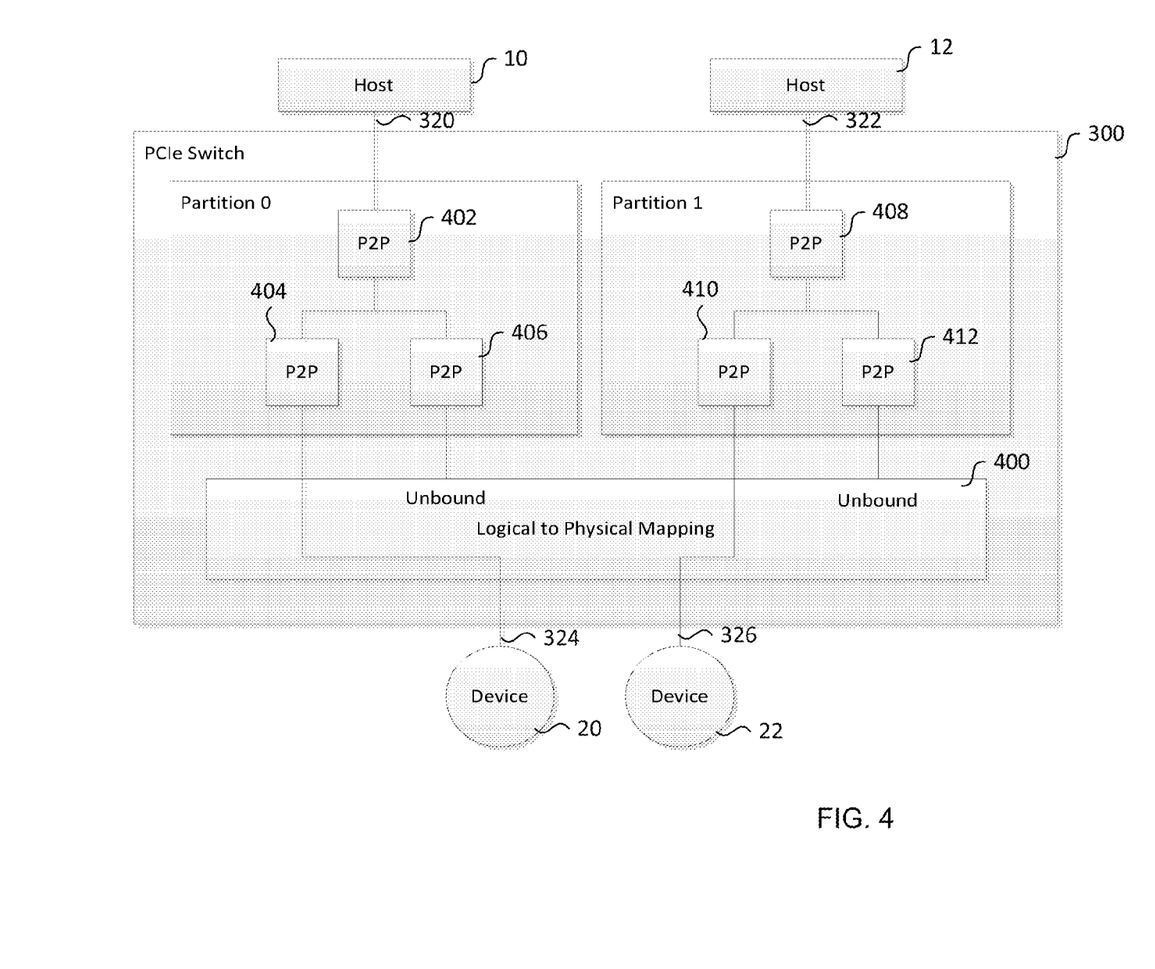
FIG. 4 is a diagram of logically configured P2P bridges in a PCIe switch according to an embodiment of the present disclosure.

FIG. 4 shows a diagram of logically configured and partitioned P2P bridges of the PCIe switch 300 in a first instance. The processor 314 of FIG. 3 has logically partitioned the PCIe switch 300 into emulated P2P bridges 402-406 on Partition 0 and emulated P2P bridges 408-412 on Partition 1. The firmware running on the processor 314 provides the PCIe switch 300 with a logical to physical mapping layer 400 between the emulated P2P bridges (the logical layer) and the PCIe ports (the physical layer).

Figure 5:
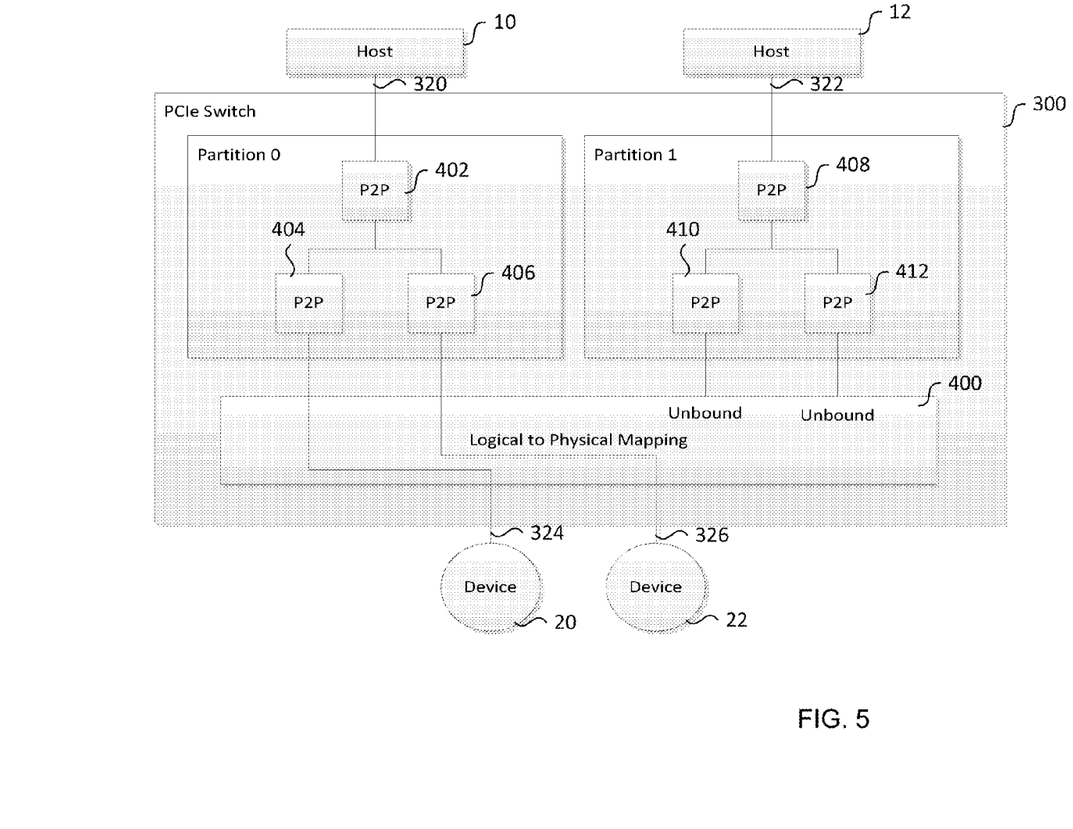
FIG. 5 is a diagram of logically configured P2P bridges in a PCIe switch according to an embodiment of the present disclosure.

FIG. 5 shows a diagram of logically configured and partitioned P2P bridges of a PCIe switch 300 in a second instance. In order to migrate the second device 22 from the second host 12 to the first host 10, the processor 314 remaps the physical port 326 from P2P bridge 410 to P2P bridge 406. Accordingly, the second device 22 may now communicate with the first host 10 without necessitating a physical hot-plug event.

In the first instance, the physical port 324 is assigned to Partition 0 and the physical port 326 is assigned to Partition 1. In the enumeration process, the host 10 configures the emulated P2P bridge 404 with address ranges required by device 20. Similarly, the host 12 configures the emulated P2P bridge 410 with address ranges required by device 22. The processor 314 also programs the routing table 312 with the configurations for each virtual P2P bridge 404 and 410. Therefore, in this first instance, the first host 10 connected to Partition 0 can communicate with the first device 20, and the second host 12 connected to Partition 1 can communicate with the second device 22.

Figure 6:
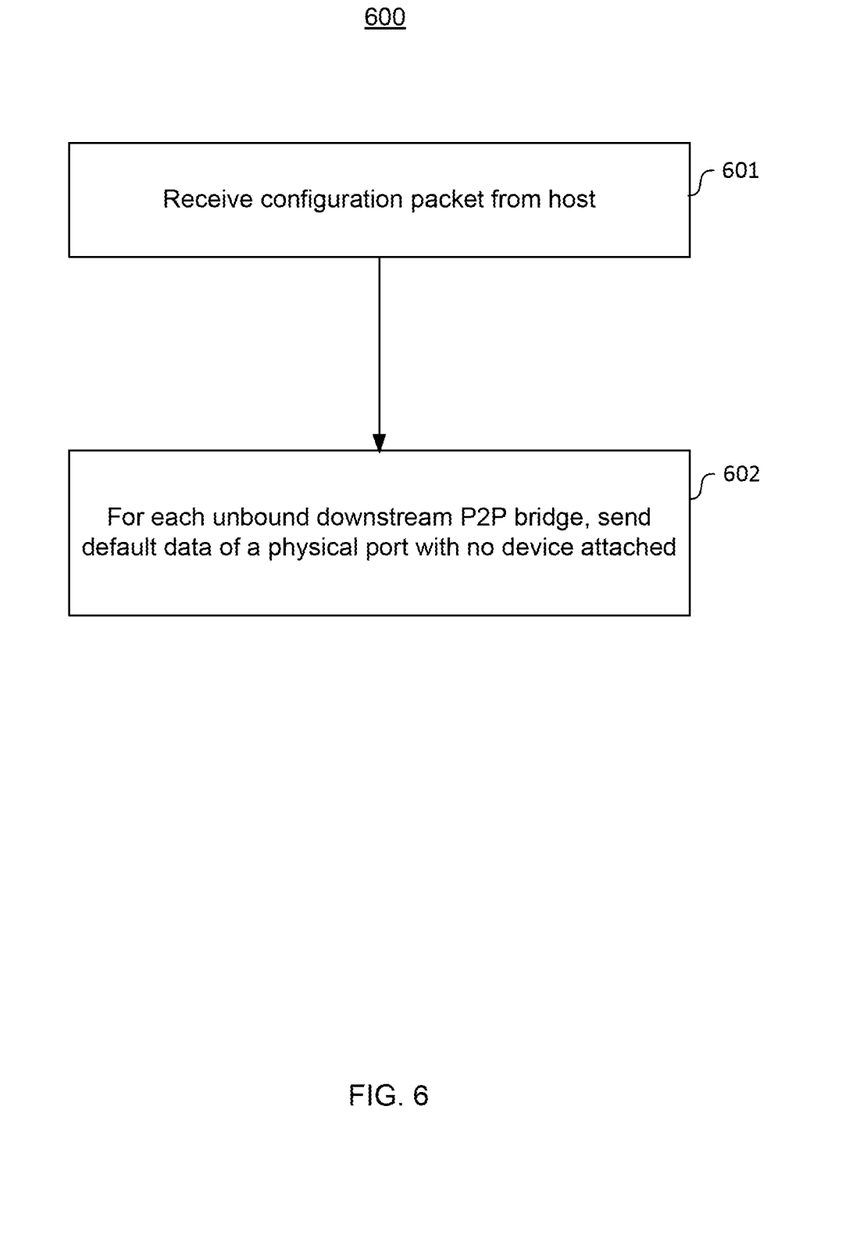
FIG. 6 is a flowchart illustrating a method for executing an enumeration procedure according to an embodiment of the present disclosure.

FIG. 6 is a flowchart diagram illustrating a method 600 for executing an enumeration procedure according to an embodiment of the present disclosure. At 601 the processor 314 receives a configuration packet from the host 10. According to the PCIe specification, the host sends configuration packets to discover the topology of the switch.

At 602, the processor 314 spoofs the host 10 by presenting the emulated downstream P2P bridges 404 and 406 as conventional P2P bridges. For the unbound emulated P2P bridge 406, the processor 314 sends default data of a physical port with no device attached. Accordingly, the host 10 will reserve placeholder address range and ID resources for the emulated downstream P2P bridge 406 in order for devices to connect in the future.

For the emulated P2P bridge 404 mapped to port 324 and connected to device 20, the host 10 enumerates the port and device according to the conventional method of the PCIe specification. The host 10 connects to the device and reads the device's required address size for writing to the configuration of the P2P bridge 404.

Similarly, the host 12 may send configuration packets to discover the topology of Partition 1 of the switch. According to method 600, enumeration proceeds in the same manner as for the host 10, above.

Thus, before the remapping operation of FIG. 5, the memory 316 includes all emulated P2P bridges 402-412. The emulated P2P bridges 402, 404, 408, and 410 include configuration information and address ranges of the respective connected devices. The P2P bridges 406 and 412 are unbound. The routing table 312 includes the configuration for the P2P bridges 404 and 410 with respect to their connected port IDs.

Figure 7:
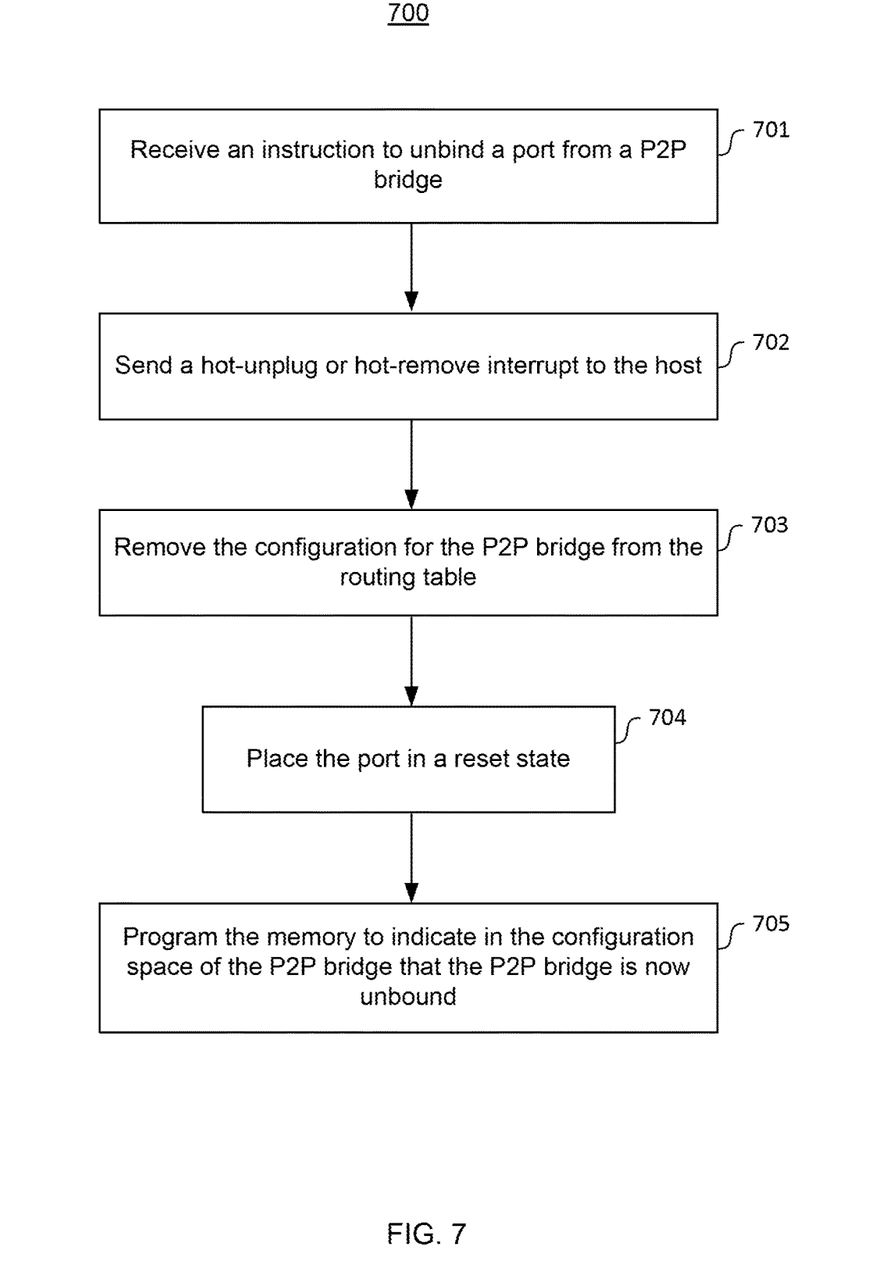
FIG. 7 is a flowchart illustrating a method for unbinding an emulated downstream P2P bridge from a physical port according to an embodiment of the present disclosure.

FIG. 7 is a flowchart diagram illustrating a method 700 for unbinding an emulated downstream P2P bridge from a physical port according to an embodiment of the present disclosure. At 701 the processor 314 receives an instruction to unbind the port 326 from the P2P bridge 410 and/or to remap the port to the P2P bridge 406, for example. The instruction may be a request initiated in software by an external management application, for example.

At 702, the processor 314 sends a hot-unplug or hot-remove interrupt to the host 12. At 703, the processor 314 removes the configuration for the P2P bridge 410 from the routing table 312. At 704, the processor 314 places the port 326 in a reset state.

Finally, at 705, the processor 314 programs the memory 316 to indicate in the configuration space of the P2P bridge 410 that the P2P bridge is now unbound. The host 12 perceives the logical unbinding of the P2P bridge 410 as a physical hot-unplug or hot-remove operation.

Figure 8:
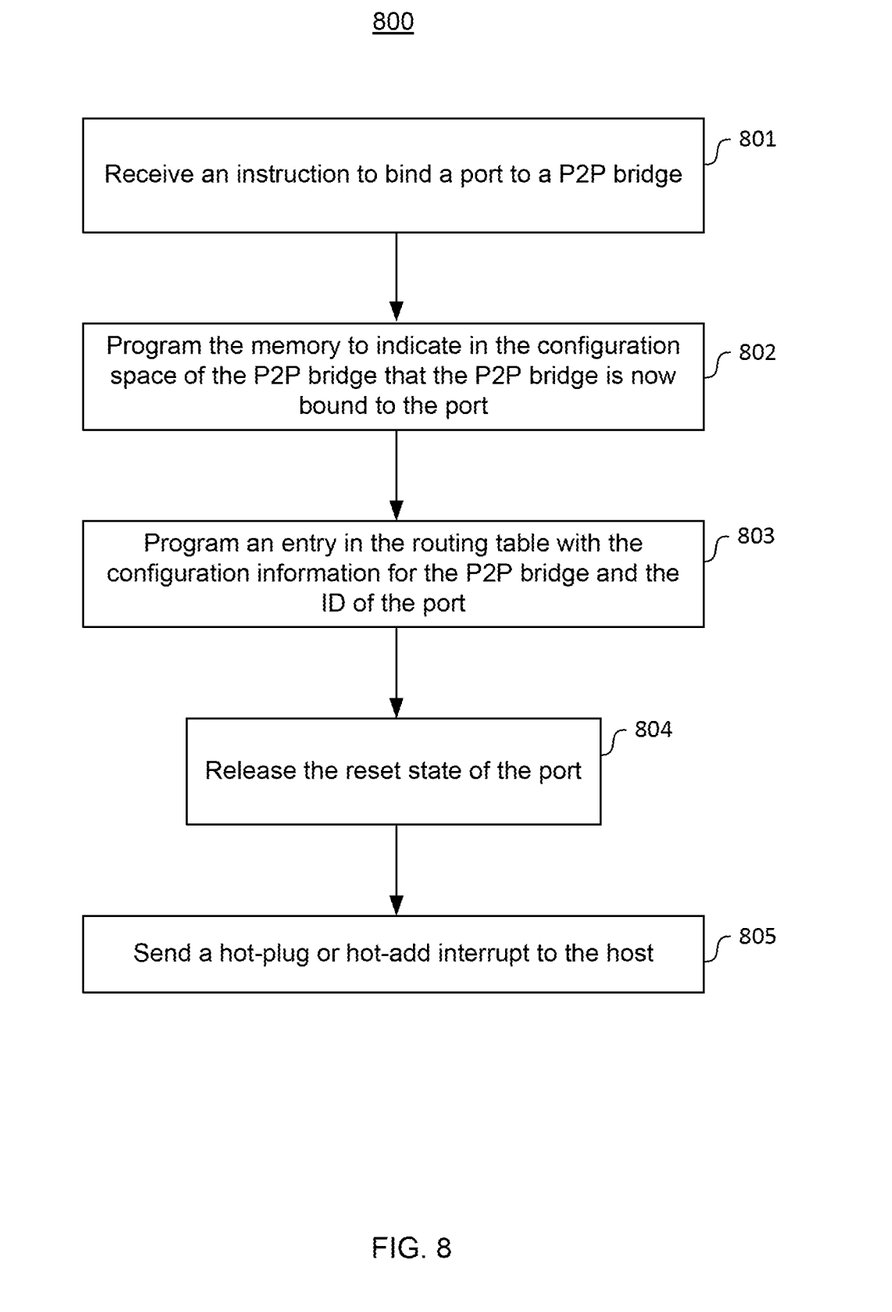
FIG. 8 is a flowchart illustrating a method for binding an emulated downstream P2P bridge to a physical port according to an embodiment of the present disclosure.

FIG. 8 is a flowchart diagram illustrating a method 800 for binding an emulated downstream P2P bridge to a physical port according to an embodiment of the present disclosure. At 801, the processor 314 receives an instruction to bind the port 326 to the P2P bridge 406 and/or to remap the port from the P2P bridge 410 to the P2P bridge 406, for example. The instruction may be a request initiated by an external management application for example.

At 802, the processor 314 programs the memory 316 to indicate in the configuration space of the P2P bridge 406 that the port 326 is connected to a device 22.

At 803, the processor 314 programs an entry in the routing table 312 with the configuration information for the P2P bridge 406. The entry includes the information for the port ID of the port 326. Thus, the routing table 312 can configure the switch matrix 310 to electrically connect port 320 to port 326.

At 804, the processor 314 releases the reset state of the port 326. Finally, at 805, the processor 314 sends a hot-plug or hot-add interrupt to the host 10. The host 10 perceives the logical remapping of the emulated P2P bridge 406 to the physical port 326 as a physical hot-plug or hot-add operation. The host 10 may now enumerate the device 22 and configure the memory space on the device 22.

Although the configuration for the P2P bridge 410 is removed from the routing table 312, the configuration is still stored in the memory 316. Therefore, the processor 314 may remap the port 326 back to the emulated P2P bridge 410 by writing the address ranges for the emulated P2P bridge 410 from the memory 316 to the routing table 312.

The port migration operation of FIGS. 4, 5, 7, and 8 is PCIe specification compliant and system-friendly. Specifically, the hosts do not need to rediscover the switch topology and P2P bridges added or removed from their partition. When the processor 314 remaps a port from Partition 1 to Partition 0, the host perceives the operation identically to a physical hot-plug.

In an alternative embodiment, the memory 316 only includes configurations for downstream P2P bridges and the processor 314 only emulates the downstream P2P bridges, such as P2P bridges 404, 406, 410, and 412. In this alternative embodiment, the upstream P2P bridges, such as P2P bridges 402 and 408 are conventionally implemented using hardware configuration registers.

In an embodiment, the PCIe switch 300 is constructed with more downstream P2P bridges than physical ports. This allows the switch to have a plurality of unbound downstream P2P bridges. These unbound P2P bridges may be dynamically configured by the processor to be remapped to physical ports. The dynamic configuration of unbound P2P bridges provides advantages such as dynamic resource allocation and host failover.

Dynamic resource allocation provides a pool of hosts and a pool of devices. The devices may be dynamically bound to hosts depending on workload. This dynamic configuration may be triggered by a customer management controller, for example.

Host failover means that a main host is supplemented by a redundant host. The main host is normally connected to all devices. However, when the main host fails, the processor can dynamically migrate all devices to the redundant host as a failover mechanism. Advantageously, the switch can migrate the devices to the redundant host without physically hot-plugging the devices.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A PCIe switch comprising:
   a plurality of ports, comprising at least one upstream port and at least one downstream port;
   a switch fabric electrically connected to the plurality of ports;
   a routing table in communication with the switch fabric;
   a memory; and
   a processor in communication with the switch fabric, the routing table and the memory for:
   creating a first configuration space of a first emulated P2P (PCI to PCI) bridge in the memory, the first emulated P2P bridge being associated with a first logical switch partition;
   receiving a request to migrate a selected downstream port to the first logical switch partition, the selected downstream port having a port ID and being associated with a second logical switch partition
   retrieving a first address range from the first configuration space in the memory; and
   configuring the routing table to associate the port ID of the selected downstream port with the first address range, wherein:
   the memory stores a second address range in a second configuration space of a second emulated P2P bridge associated with a second logical switch partition; and
   the processor is further configured to unbind the second emulated P2P bridge from the selected downstream port by configuring the routing table to dissociate the port ID of the selected downstream port with the second address range.

2. The PCIe switch of claim 1, wherein:
   the first configuration space is programmed by a first host to comprise a first endpoint device address range; and
   the second configuration space is programmed by a second host to comprise a second endpoint device address range.

3. The PCIe switch of claim 2, wherein configuring the routing table to associate the port ID of the selected downstream port with the first address range comprises creating, in the routing table, an entry associating the first endpoint device address range with the port ID of the selected downstream port.

4. The PCIe switch of claim 3, wherein the processor is further configured to:
   receive an instruction to bind the selected downstream port to the first emulated P2P bridge;
   program the memory to indicate in the first configuration space that the first emulated P2P bridge is bound to the selected downstream port;
   release a reset state of the selected downstream port; and
   send an interrupt signal to the host.

5. The PCIe switch of claim 2, wherein configuring the routing table to dissociate the port ID of the selected downstream port with the second address range comprises deleting, in the routing table, an entry associating the second endpoint device address range with the port ID of the selected downstream port.

6. The PCIe switch of claim 5, wherein the processor is further configured to:
   receive an instruction to unbind the selected downstream port from the second emulated P2P bridge;
   send an interrupt signal to the host;
   place the selected downstream port in a reset state; and
   program the memory to indicate in the second configuration space that the second emulated P2P bridge has no device attached.

7. A method for migrating a downstream port in a PCIe switch, the method comprising:
   creating a first configuration space of a first emulated P2P (PCI to PCI) bridge in a memory, the first emulated P2P bridge being associated with a first logical switch partition;
   receiving, at a processor, a request to migrate the downstream port to the first logical switch partition, the downstream port having a port ID and being associated with a second logical switch partition;
   retrieving a first address range from the first configuration space in the memory; and configuring a routing table to associate the port ID of the downstream port with the first address range;

storing in memory a second address range in a second configuration space of a second emulated P2P bridge associated with a second logical switch partition; and unbinding the second emulated P2P bridge from the port by configuring the routing table to dissociate the port ID of the downstream port with the second address range.

8. The method of claim 7, wherein:

the first configuration space is programmed by a first host to comprise a first endpoint device address range; and the second configuration space is programmed by a second host to comprise a second endpoint device address range.

9. The method of claim 8, wherein configuring the routing table to associate the port ID of the downstream port with the first address range comprises creating, in the routing table, an entry associating the first endpoint device address range with the port ID of the downstream port.

10. The method of claim 9, further comprising:

receiving an instruction to bind the downstream port to the first emulated P2P bridge;

programming the memory to indicate in the first configuration space that the emulated P2P bridge is bound to the downstream port;

releasing a reset state of the downstream port; and sending an interrupt signal to the host.

11. The method of claim 8, wherein configuring the routing table to dissociate the port ID of the downstream port with the second address rage comprises deleting, in the routing table, an entry associating the second endpoint device address range with the port ID of the downstream port.

12. The method of claim 11, further comprising:

receiving an instruction to unbind the downstream port from the second emulated P2P bridge;

sending an interrupt signal to the host;

placing the downstream port in a reset state; and programming the memory to indicate in the second configuration space that the second emulated P2P bridge has no device attached.

* * * * *